United States Patent [19]
Peisker

[11] 3,927,600
[45] Dec. 23, 1975

[54] METHOD OF FORMING A MOLDING CORE FOR USE IN FORMING A SEAL UNIT

[75] Inventor: Glenn W. Peisker, Barrington, Ill.

[73] Assignee: Chicago Rawhide Manufacturing Company, Elgin, Ill.

[22] Filed: Nov. 8, 1974

[21] Appl. No.: 522,101

Related U.S. Application Data

[60] Division of Ser. No. 246,865, April 24, 1972, abandoned, which is a continuation-in-part of Ser. No. 213,693, Dec. 29, 1971, abandoned.

[52] U.S. Cl................... 90/11 C; 90/13.6; 90/13.9; 90/15 A
[51] Int. Cl.².... B23C 1/027; B23C 1/16; B23C 3/34
[58] Field of Search....... 90/11 C, 11.44, 13.1, 13.2, 90/13.9, 15 R, 15 A, 13.4, 13.6, 13.7; 51/90

[56] References Cited
UNITED STATES PATENTS

| | | | |
|---|---|---|---|
| 985,412 | 2/1911 | Hattersley et al................ | 90/15 A X |
| 2,730,906 | 1/1956 | Dickerson......................... | 90/13.9 X |
| 3,187,467 | 6/1965 | Cortesi.............................. | 51/90 X |
| 3,224,146 | 12/1965 | Ahlstrom.......................... | 51/90 |

Primary Examiner—J. M. Meister
Assistant Examiner—Fred A. Silverberg
Attorney, Agent, or Firm—James T. FitzGibbon

[57] ABSTRACT

Various oil seal constructions are described in which the flexible primary lip portion is defined by converging first and second, at least partially axially undulating, frusto-conical surfaces disposed respectively at first and second included angles with respect to the axis of said seal unit, facing respectively the exterior and interior of a region to be sealed, with the lip engaging an oppositely directed surface portion of a sealed element in fluid-tight relation along an undulating seal band area formed by the convergence of said undulating frusto-conical surfaces, with said first angle being smaller than said second angle. The lip or contact patterns include sinusoidal, cycloidal, zig-zag or chevron forms, and various other forms as well. In certain forms, the surfaces undulate radially only, while in still other forms, the surfaces meeting to define the seal band undulate both radially and axially, while the seal band is in all cases of substantially constant radius. A method of making portions of a mold for forming such seals is also disclosed. The seals provide an excellent static seal and also return fluid along a shaft or the like to the sealed region by a so-called hydrodynamic pumping action.

5 Claims, 18 Drawing Figures

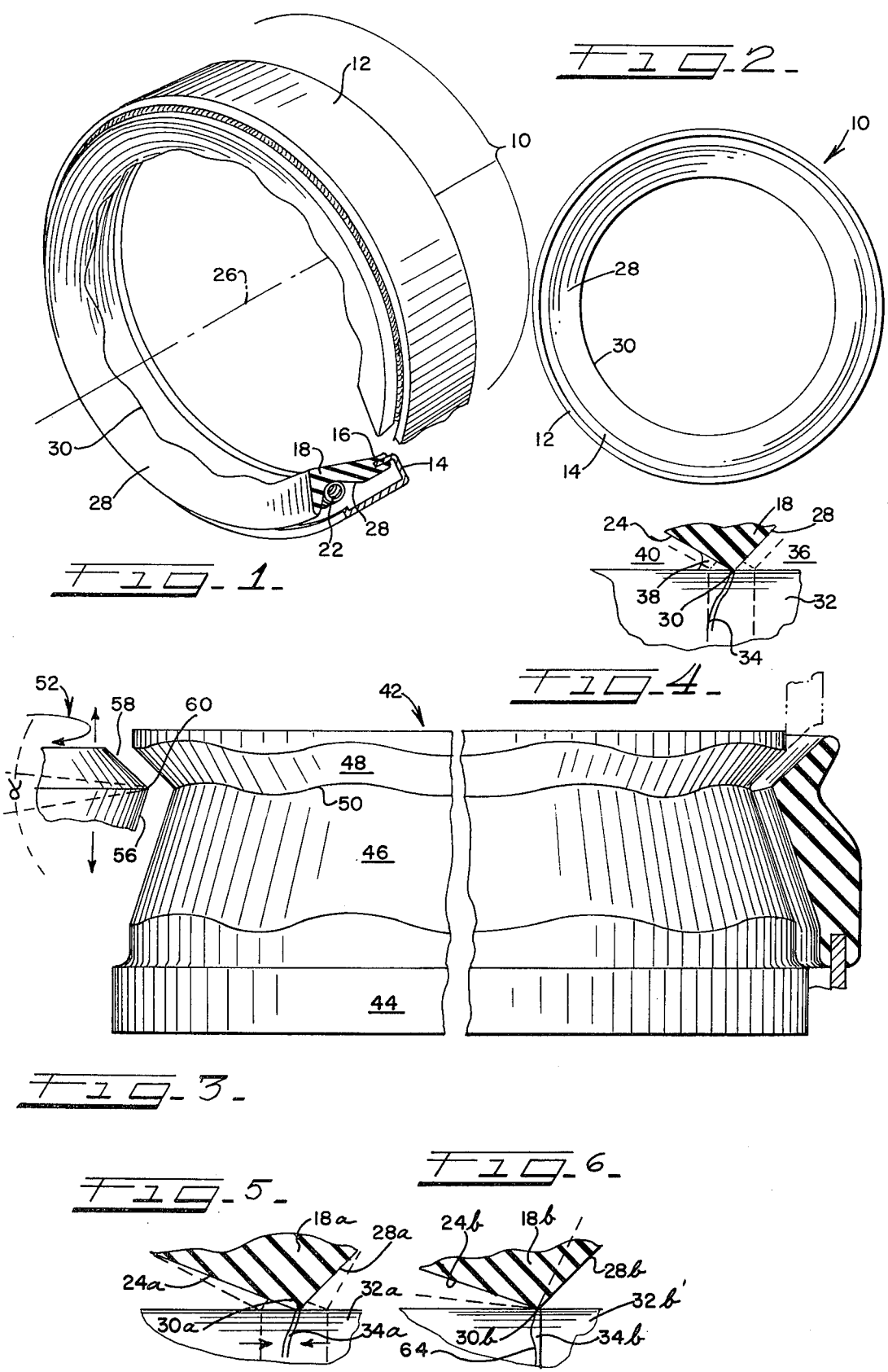

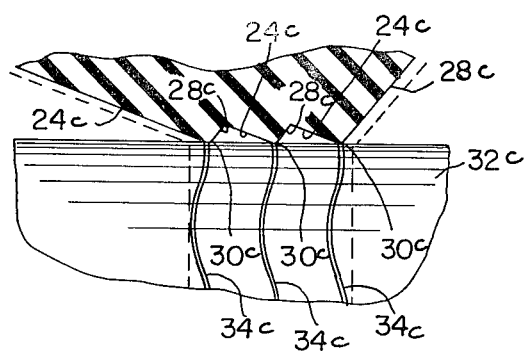
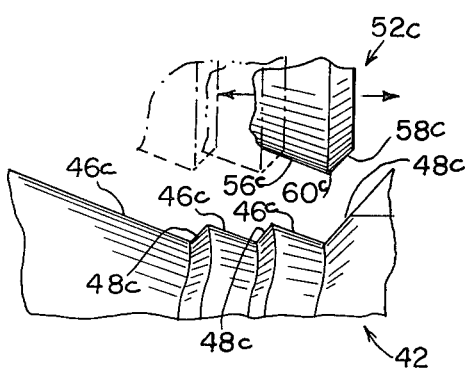
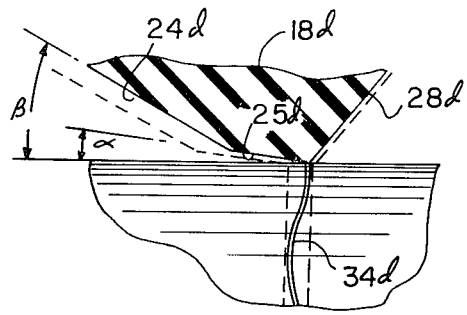
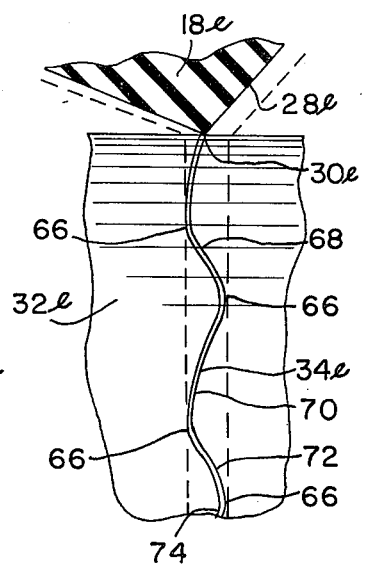
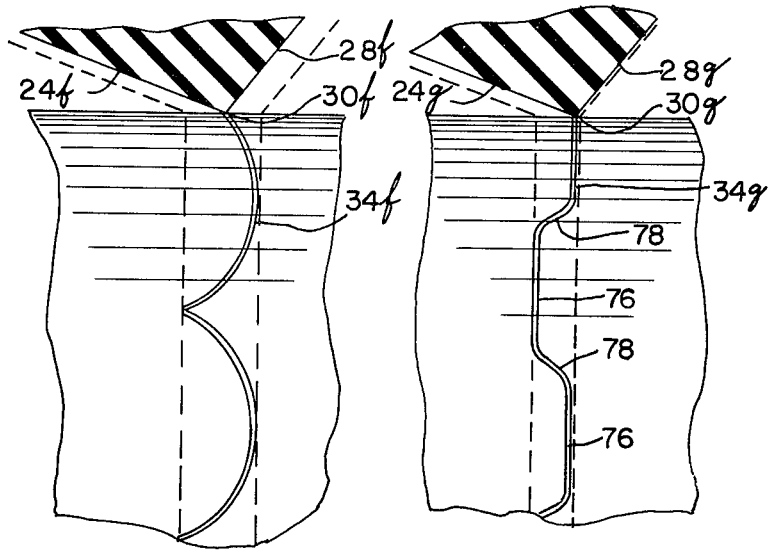

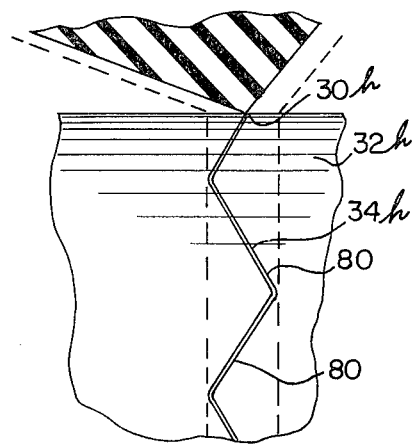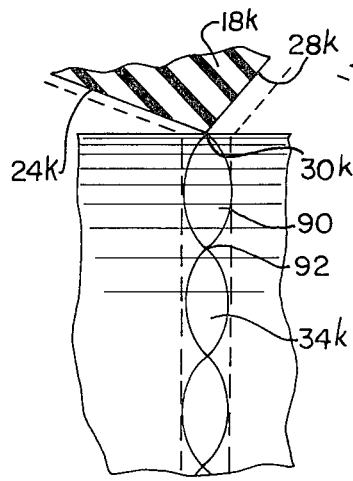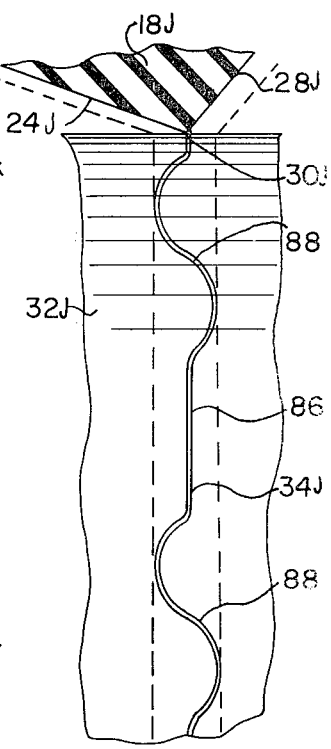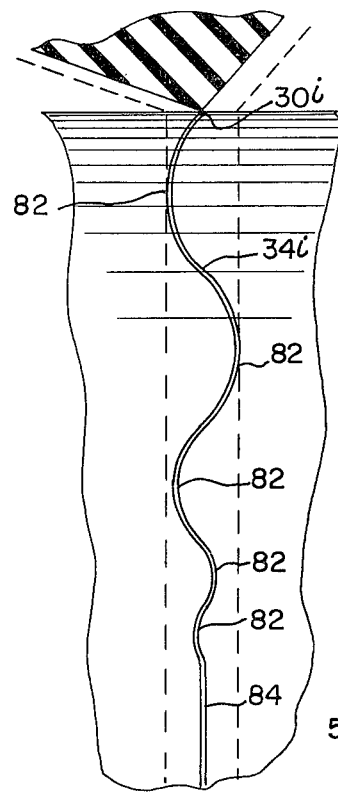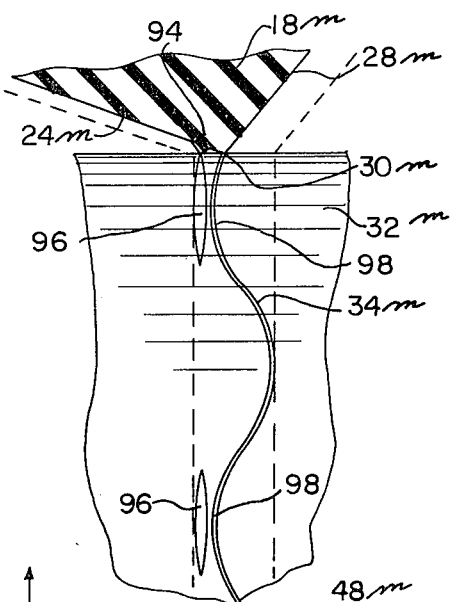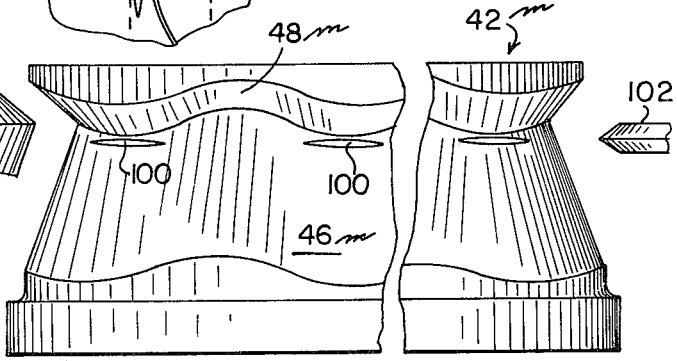

METHOD OF FORMING A MOLDING CORE FOR USE IN FORMING A SEAL UNIT

REFERENCE TO RELATED APPLICATIONS

This is a division of application Ser. No. 246,865, filed Apr. 24, 1972, now abandoned which is a continuation-in-part of my earlier application Ser. No. 213,693, filed Dec. 29, 1971, now abandoned.

BACKGROUND OF THE INVENTION

The present invention relates generally to improved fluid seals for oil, grease and the like, and, more particularly, to seals adapted to pump fluids across one or more lines of contact formed between a portion of the seal and the shaft or other machine element with which sealing contact is made. In use, the seals are intended to provide a static sealing action when used with oil, grease, transmission fluids or the like, and, when relative motion occurs between the seals and the surfaces of the parts against which sealing contact is made, the seals act to pump a certain amount of fluid from the so-called dry or exterior side of the shafts back toward the wet side and into the regions to be sealed.

The seals of the invention are embodied in various forms, in one of which the seal band describes a sinuous path about the circumference of the surface to be sealed. In another form, the so-called barrel angle or angle or inclination of one or both of the frusto-conical surfaces forming the exterior or dry side of the seal changes in angularity from the seal axis as the seal surface extends around the barrel cone. In other forms, both features are combined, while in still other forms, the seal band configurations are of various other forms.

The invention is also directed to a method of making such seals in a simple and straightforward manner.

In the prior art, so-called pumping seals of various types have been known and used, with varying degrees of success. It is now generally postulated that the phenomena on which seal pumping actions are based vary somewhat among different seal designs. For example, certain seals are believed to depend for pumping action on the provision of one or more wedge-like elements which lie generally parallel to the axis of the shaft to be sealed and form a so-called seal band or contact path with the shaft of a narrow annular configuration but having one or more spaced apart barbs or other projections adapted to engage fluid lying on the shaft and pump the fluid toward the dry side of the seal and into the region to be sealed by an action analogous to skimming or plowing, and thus depending upon the pumping elements to scrape the oil from the shaft surface and force it beneath the principle seal band in this way.

Other attempts to create pumping seals for associated elements depend on the provision of a region of decreasing cross-sectional area, either radial, axial, or both, formed between two lips having at least portions thereof forming a contact pattern or seal band on the shaft. It is believed that resistance of the oil to compression beneath the conical surface of the seal and between the ribs or lips causes the primary lip to be raised very slightly and permits oil to pass thereunder into the region to be sealed.

Another form of dynamic pumping seal is one wherein pumping areas are provided on the dry or exterior side of the seal and are defined by relatively larger wedges characterized by the presence therebeneath of pressure gradients which force the oil toward and under the primary lip, perhaps raising it somewhat to permit flow therebeneath. In this type of seal, the lifting action results from hydrodynamic force. At low speeds, or when no relative movement is present, radially directed seal surfaces tightly engage the shaft to provide a fluid-tight static seal.

However, although seals of the foregoing types have proved satisfactory in use, they have been thought to be capable of further improvement in certain areas. For example, certain of the foregoing seals, particularly those which include pumping elements approaching and departing radially from a sealed surface, are characterized by high contact pressure, and more importantly, are very sensitive to variations in contact pressure. Accordingly, such seals wear rapidly under conditions of dry starting. Moreover, seal dealers are forced to carry a large supply of different sizes of such seals, since shafts varying in size from one another by only a few thousandths of an inch must be fitted with different sized seals. Since such a condition prevents achievement of maximum production economy, seals of this type often tend to be unduly expensive. On the other hand, if dealers or users do not follow installation specifications exactly, the seals perform very poorly.

In seals depending upon Hydrodynamic action, it is sometimes found that size variation causes pressure variations which create varied pumping capacities; such seals must also conform to rather narrow tolerances.

In some or all of the foregoing types of seals, forming mold parts for manufacturing such seals has often created a problem, since cuts of precise depth and location are required to be ground in the mold cores used in seal manufacture.

Elaborate and expensive apparatus and materials have also sometimes been required to make molds of this type to sufficiently precise standards to be useful. Accordingly, in view of the shortcomings of certain prior art devices, in view of the shortcomings in the method of manufacture thereof, and in view of the need for further improved fluid seals, particularly hydrodynamic or pumping seals, it is an object of the present invention to provide an improved fluid seal.

Another object is to provide an oil seal having, in use, a capacity to pump measurable quantities of oil from the exterior of a sealed region back to the interior of such region.

A further object is to provide an oil seal which will provide good static sealing characteristics and good dynamic pumping action and which may achieve both of these objects while being much less critical than prior known seals in respect to the range of shaft sizes which may be satisfactorily sealed by one given size of seal.

Another object is to provide various forms of oil seals which reduce or eliminate ingestion and accumulation of dirt and dust.

Another object is to provide an oil seal having a single sealing lip forming a cycloidal, hypocycloidal, or like contact pattern on a shaft or other associated member to be sealed.

A still further object is to provide a seal having a sealing lip with a zig-zag or chevron-like seal band, or a seal band having at least a pair of axially offset sealing surface areas enjoined to each other by axially inclined transition surfaces.

Still another object is to provide such an oil seal wherein a wave-like contact pattern is formed on an associated shaft or other member and wherein the angle of approach and angle of departure respectively toward the wave nodes are different from each other.

Yet another object is to provide a seal having a contact band partially formed of sinuous or curved elements and partially formed of relatively straight line elements.

Another object of the invention is to provide a seal having an axially undulating contact pattern and having auxiliary pumping elements associated with certain portions of the contact surfaces, particularly the portions of the surfaces which are offset farthest axially from the center of the contact zone. A still further object is to provide a shaft seal having a seal pattern of varying width and formed from co-axially generated surfaces which are out of phase with respect to each other.

Another object is to provide a seal unit having a plurality of axially undulating seal band surfaces.

Still another object is to provide a seal unit adapted to provide an undulating seal band or contact pattern on an associated shaft or like member and wherein the air or dry side surface of the sealing lip is formed by surfaces of different radial extent, with the surface lying closest to the lip having an angle between itself and the shaft axis which is smaller than the angle between the remote surface and the shaft axis.

Another object is to provide improved oil seals of any of the foregoing types which will provide a novel pumping action serving to return oil to the sealed region in either relative direction of shaft rotation.

Still another object is to provide a seal for a shaft or other machine member in which the degree of pumping action does not inherently depend on the size of the seal or the part to be sealed.

Another object of the invention is to provide a method of making one or more forms of oil seals which is simpler and more direct than previously used methods.

A still further object is to provide a method of making mold or core elements used in the manufacture of one or more of the forms of oil seals referred to herein, such method being greatly simplified in relation to prior art methods of manufacturing mold cores and like parts.

A still further object is to provide a novel oil seal wherein a number of undulations or sinuosities in the primary lip may be any desired number without altering the basic method of seal manufacture.

Another object is to provide a seal unit in which a pair of frusto-conical surfaces meet to define a primary sealing lip portion, and wherein the angle between the seal axis and the surface on the dry side of the seal is less than the angle between the seal axis and the surface on the wet side of the seal, and in which at least the angle between the seal axis and the exterior surface varies periodically throughout the extent of the seal.

A still further object is to provide a seal unit in which a pair of frusto-conical surfaces meet to define a primary sealing lip portion, and wherein the angle between the seal axis and the surface on the dry side of the seal is less than the angle between the seal axis and the surface on the wet side of the seal, and in which the frusto-conical surfaces undulate axially to provide an undulating band for contact with a part to be sealed.

Another object is to provide a method of making a mold core for a seal unit which includes cutting a generally V-shaped groove in a tapered cylindrical seal forming core while, during rotation of the cutting tool about its axis, moving the core through an axial distance and returning it to the point of origin, thereby creating a line of maximum depth in said core having a constant radius from the center of the core but undulating axially.

The foregoing and other objects of the invention are achieved at least in part in practice by providing an oil seal having a single sinuous primary lip adapted for sealing contact with a shaft to be sealed and formed by the convergence of two generally frusto-conical surfaces which undulate axially, radially, or both, and in which the angle between the exteriorly facing surface and the shaft axis is reduced in relation to the angle between the shaft axis and the interiorly facing sealing lip surface. The objects are also carried out by providing seals having certain of the foregoing features, and other features referred to in detail elsewhere herein.

The manner in which these objects and advantages, and other objects and advantages not specifically enumerated herein, are carried out will become more clearly apparent when reference is made to the following detailed description of the preferred embodiments of the invention set forth by way of example and shown in the accompanying drawings, wherein like reference numbers represent corresponding parts throughout.

BRIEF DESCRIPTION OF THE DRAWINGS

FIG. 1 is a perspective view, with portions broken away, showing one form of a novel oil seal made according to the present invention;

FIG. 2 is an axial or end elevational view of the form of oil seal shown in FIG. 1 and made according to the present invention;

FIG. 3 is a view, partly in cross section and partially in elevation, showing a portion of the oil seal of the invention, a portion of the mold core used to make this form of the seal, and a portion of the cutting tool used to form the core;

FIG. 4 is a fragmentary view of a portion of the form of oil seal of FIGS. 1 and 2, showing the primary lip of the seal associated with an adjacent shaft and showing a portion of the contact path made by this seal on an associated shaft;

FIG. 5 is a fragmentary view of a portion of another form of the oil seal made according to the invention and showing a portion of the contact path made by this seal on an associated shaft;

FIG. 6 is a fragmentary view of a portion of still another form of seal made according to the invention, and showing the contact path made by this form of seal on an associated shaft;

FIG. 7 is a vertical sectional view of a modified form of a seal showing the pattern thereof formed on an associated shaft;

FIG. 8 is a fragmentary sectional view showing the method of making a molding core useful in the manufacture of the form of seal shown in FIG. 7;

FIG. 9 is a vertical sectional view of a still further form of seal made with the present invention;

FIGS. 10–16 are vertical sectional views of portions of further modified forms of seals made according to the invention, and showing in developed form the type of sealing pattern or contact band generated by such seal on shafts associated therewith;

FIG. 17 is a vertical sectional view of a still further modified form of seal and showing a pattern created thereby on an associated shaft; and FIG. 18 is an elevational view of a mold core used to form a seal unit of the type shown in FIG. 17.

DESCRIPTION OF THE PREFERRED EMBODIMENTS OF THE INVENTION

Although it will be understood that the principles of the invention may be applied to a number of different forms of oil, grease or other fluid seals, and that the invention applies equally to seals wherein the flexible lip is urged either radially inwardly or outwardly into sealing contact with a shaft or other element to be sealed, a description will be made, for purposes of illustration, of various forms of oil seals in which the molded lip portions are urged by a radially inwardly directed force into sealing engagement with rotatable shafts passing axially therethrough.

It will be understood that, as used herein, the expression "pumping" means forcing of oil along a shaft from the exterior of a region to be sealed back into the interior thereof; this pumping action is observed as a net effect, ordinarily by the reduction in the volume of an annular meniscus of oil formed between the shaft and the frusto-conical surface of the exterior or the dry side of the sealing lip. By "seal band" is meant the portion of the sealing lip where the frusto-conical surfaces meet and which actually engages the shaft or other member, although it will be understood that, properly speaking, this region may not be one of literal contact between the shaft and the lip because these parts are separated by a very thin layer of oil or other fluid lying between the shaft and the seal. The behavior of the fluid is a very important feature of the invention.

Referring now to the drawings in greater detail, FIG. 1 shows the invention to be typically embodied in a radially inwardly acting shaft seal assembly generally designated 10 and intended to maintain an oil seal between a member in which the assembly is received and a relatively rotatable shaft or other element passing therethrough. As shown in FIG. 1, the seal includes an interior, annular, outwardly directed mounting flange 12, a radially extending offsetting flange 14 and a generally axially extending flange 16 to which is firmly secured, as by bonding, a resilient, elastomeric seal body 18. The body 18 includes an annular groove 20 in which is received means in the form of a so-called garter spring 22 for applying a radial compressive load to the seal.

An axially undulating, generally frusto-conical first surface portion 24 of the seal body 18 at least partially faces the exterior of a region to be sealed, and is disposed at a moderate angle to an imaginary line 26 representing the axis of the seal and shaft or other part to be sealed. A generally oppoistely facing, axially undulating frusto-conical second surface portion 28 of the body 18 is directed toward the interior of the sealed region and is disposed at a somewhat steeper angle to the axis 26 of the seal. The seal band 30 is formed by the line of convergence between the undulating surfaces 24, 28 and is therefore in the form of an axially undulating or sinuous area which, in position of use over the shaft, defines an area of small but measurable axial extent. Since the radius of the seal band 30 is constant, the interior of the seal assembly 10 formed by the seal band 30 appears circular when viewed axially of the seal or in end elevation as shown in FIG. 2.

Referring now in greater detail to FIG. 4, a fragmentary view is shown of a seal assembly 10 in which the body 18 is shown in a given position with the surfaces 24, 28 of the lip shown to meet to define the lip seal band 30. On the surface of an associated shaft 32, shown only fragmentarily, it will be noted that a sinuous path 34 of finite width is provided, and it will also be seen from the broken line portions of FIG. 4 that, as the pair of frusto-conical surfaces 24, 28 undulates axially, the locus of the contact path 34 continually changes, providing a sinuous pattern 34 on the shaft 32. The broken lines in FIG. 4 show the total excursion of the path 34 to either side of the center position shown in solid lines. As may also be noted by reference to FIGS. 1 and 4, the angle of the surface 28 in respect to the surface of the shaft 32 or the axis 26 thereof is a relatively steep, preferably of the order of about 45° to 50°, while the surface 24 facing the dry side or the exterior of the sealed region is of a reduced angle, of the order of 20° to 25°, merely by way of example.

Referring now to the operation of the form of seal assembly shown in FIG. 1, this unit 10 is preferably installed in a manner well known to those skilled in the art, usually within a counterbore or recess in a machine member, and with a shaft 32 extending axially therethrough into an interior or sealed region generally designated 36. In use, by reason of the lapse of time, gradual seepage, dynamic factors, etc., a certain amount of oil will normally collect and form a meniscus 38 between the surface 24 and the surface of the shaft 32. This oil is in a region 40 which is exterior to the sealed region 36. After an increasing volume of oil collects to form the meniscus 38, however, surface tension forces may become insufficient to maintain the meniscus, causing the oil to progress axially along the shaft 32 and ultimately drip therefrom. This causes loss of lubricant, inconvenience to equipment owners, and creates the possibility of damage to the mechanism in question.

However, in keeping with the objects of the present invention, when the shaft 32 rotates, the seal body 18 remains fixed, but the sinuosity of the path 34 causes the contact path 34 at the seal band 30 to sweep periodically back and forth across the wetted surface of the shaft 32. Tests performed to evaluate seals made according to the present invention indicate that such a seal deomonstrates the capacity to pump significant oil across the seal band 30 and from the region of the meniscus 38 into the interior 36 of the region to be sealed.

Although it is not known with certainty why the seals made according to the invention are successful, and whereas the present invention is not intended to be limited to any particular theory or mode of operation, it is believed possible that the slightly angled surface 24 floats more easily and with less scraping effect over a film of oil beneath it and in contact with the shaft than does the more steeply angled surface 28. Accordingly, axially reciprocating movement of the seal body 18 across the shaft will tend to scrape or squeegee a certain amount of oil in each direction, but will force more oil toward direction faced by the more steeply angled surface and less oil toward the side of the less steeply angled surface, thereby resulting in a net oil movement toward the side of the sealing lip having the steeply angled surface. Such oil movement would be to the right as shown in FIG. 4 and from the exterior region 40 to the region 36 to be sealed.

As pointed out above, tests have indicated that a seal of this type has a pumping capacity which is substantially equal to or somewhat better than the pumping capacity of certain other commonly used prior art pumping type oil seals, and substantially better than the pumping capacity of a number of other forms of pumping seals. Moreover, this form of seal has other advantages which are referred to elsewhere herein.

However, in most forms of seals described herein, the pumping capacity is not excessively large as it is in the case of some other prior art seals. Moreover, the pumping capacity has proved to vary less with shaft speed with the described designs than with other designs, and therefore, the same seal design can be used equally well in high speed, low speed, and moderate speed applications. Thus, a typical seal of the type described herein pumps well at moderate rotational speeds but does not pump excessively at very high speeds so as to tend to pump the seal dry. In addition, seals according to the invention maintain their pumping capacity throughout a more extended seal life, that is, the pumping effectiveness thereof does not drop off in use. Therefore, seals made in accordance with the invention are improved from the three standpoints of having substantial but not excessive pumping capacity, less correlation between shaft speed and pumping rate, and better maintenance of significant pumping capacity throughout an extended life.

In addition to the advantages referred to elsewhere herein, another advantage of the present invention is that the manufacture of seals of this type may be carried out by methods of mold making which are not greatly different from methods used to make molds for prior art seals. For example, in the prior art, a so-called molded lip seal is normally formed by sinultaneously molding the elastomeric lip portion of a seal assembly and bonding it to the flange portion of an annular stamping having a portion thereof extending into the molding cavity. In such seals, the inner part of the mold is formed at least in part by a so-called mold core having two frusto-conical surfaces intersecting along an annular line where the seal band will be formed. These surfaces are normally imparted to the core by a cutting or grinding tool having counterpart surfaces, namely, two frusto-conical surfaces meeting along an annular line. In this methods, the mold core is rotated about its axis and the tool is rotated about its own axis and also about the axis of the core while being moved to a predetermined radial position relative to the mold core.

Referring now to FIG. 3, a novel mold core 42 of a type adapted to produce seals according to the invention is shown to include a body portion 44 and to differ from the conventional mold cores just referred to, principally in that the frusto-conical surfaces 46, 48 are undulating surfaces, causing the line 50 along which they meet to be a sinuous or undulating line. This form is imparted to the mold core 42 by moving the conventionally shaped cutting tool 52, which includes surfaces 56, 58 joined along line 60, not only radially to the determined depth, but also axially as indicated by the arrows in FIG. 3 as the tool 52 is moved about the periphery of the core 42.

According to the invention, the cutting tool 52 is not merely reciprocated axially while the core 42 is rotated, nor is it reciprocated randomly while being moved about the axis of the core body 44. The reciprocating movement of the cutting tool 52 is always repeatedly made in response to a predetermined degree of rotation of the core body 44, and hence the form of core shown in FIG. 3 is produced, rather than merely a core having frusto-conical surfaces and a wide axial seal band area joining them at the radially inner portions thereof. By way of example, the cutting tool 52 is rotated at a given rate, and the cutting tool 52 reciprocates to its maximum travel point in each direction and back to a center position for every 60° of relative rotation of the core 42. This motion is repeated periodically, with the cutter always tracing the same reciprocating movement on corresponding portions of the core during successive cuts.

Referring now to FIG. 5, an alternate form of seal lip 18a is shown wherein the undulating surfaces 24a, 28a, which meet to define the contact band 30a undergo periodic angular variation throughout their extent, and thus undulate radially as well as axially. In the form shown, when the seal band 30a is farthest spaced apart from the region 36 to be sealed, the angle between the surface 24a and the shaft axis is greatest, while this angle is least when the seal band 30 most closely approaches region 36 to be sealed. Conversely, surface 28a is at the steepest angle when the seal band is nearest the region 36 and vice versa. The included angle between surfaces 24a, 28a does not change, except insofar as may be caused by distortion of the elastomeric materials.

Tests have shown that seals made according to FIG. 5 will demonstrate performance which is the same and sometimes even better than that of seals of the type shown in FIG. 4.

Referring now to FIG. 6, the construction of a still different form of seal body 18b is shown. As illustrated herein, the surfaces 24b, 28b also undergo a periodic radial undulation, the angle of the surface 24b for example periodically decreasing from the solid line position thereof to the broken line position thereof, and returning to the solid line position. At the same time, the angle of surface 28a increases toward the broken line position thereof and returns to the solid line position. As a result of the inherent flexibility of the body 18b, the contact path 34b formed on the shaft 32b by the seal band 30b may have the exterior edge portion 64 undulate somewhat. However, this is not believed to be of importance of and is only accounted for by the fact that the decreasing angle places a greater portion of the surface 24b in contact with the shaft.

However, quite surpirsingly, although the seal of FIG. 6 is not shown to be provided intentionally with an undulating contact path 34b, it has been discovered that a small but definitely noticeable pumping action results from the use of this seal. Although it is not understood with certainty why such an action occurs, and the operation of this form of seal is not intended to be limited by any operational theory, it is thought possible that the fact of installing the seal itself in normal use will result in a certain amount of cocking or tilting of the plane of the seal from a plane exactly perpendicular to the axis 26 of the part to be sealed. As a result, a very slightly undulating path is in fact developed along the surface of an associated path, and this, together with the varying angle, serves to provide a limited but effective pumping action. It is also considered possible that such eccentricity or offset may be partially accounted for by dynamic run-out of the shaft in relation to the seal, by shaft-to-bore misalignment, or the like. Accordingly, the principles of the invention may also be carried into practice in some cases by providing a seal having a surface which undulates radially rather than axially.

Referring again to FIG. 3, the method of forming the seals of the type shown in FIGS. 5 and 6 is also illustrated. In the case of the seal of the type of FIG. 5, the same operation is carried out as described in connection with the description of making a mold core for seals of the form of FIGS. 1, 2 and 4, except that, in addition to the axial undulation, the plane of the cutting tool 52 is periodically inclined, as through an angle alpha shown in broken lines in FIG. 2, about a point on the lines 60 where the tool 52 engages the surface of the core body 42. As a result, the axial center line of the tool 52 is swung or rocked through an arc with the peripheral, core-engaging point thereof serving as the axis or center thereof.

To make a seal of the type shown in FIG. 6, the same rocking action is imparted to the axis of the tool 52, but the tool is not traversed axially during this time, and consequently, the line 50 lies in a single plane, but the surfaces 46, 48 undulate, with the portions thereof lying farthest from the seal band 30b undergoing the greatest movement.

Referring now generally to the performance and use of seals of the type described herein, it has already been pointed out that seals of the type shown in FIGS. 4, 5 and 6 are very effective to pump oil from the exterior of a sealed region along the shaft between the outer surface of the shaft and the seal band and into the interior of the region to be sealed. Although this function, which may in itself be provided to a greater or less extent by certain prior art seals, is accomplished in a much different manner in the present invention, it is not the only advantage of the present seal.

For example, it is known that, in addition to the pumping or hydrodynamic aspects of a seal, a satisfactory seal is one which maintains a good static seal throughout a wide range of conditions of use. Seals made according to the present invention, for example, are capable of providing static sealing performance which is superior to prior known pumping seals, particularly insofar as seals of the invention may be fitted to shafts having considerable size variation without exhibiting oil leakage. It has been determined that, in respect to a typical pumping seal of the prior art, a seal made according to the invention in a predetermined size will pump an equal or greater quantity of oil when fitted on a range of shaft sizes which is two to three times the size range of shafts able to be sealed effectively both statically and dynamically with prior art pumping seals. In such cases, the pumping rate will also vary less with speed, and a significant pumping capacity will remain even after extended use.

Accordingly, a manufacturer is not required to make the large number of different sizes of seals that would otherwise be required for a range of shaft sizes, and jobbers and distributors need not stock such a large variety of seal sizes. Accordingly, production economies of a significant order may be achieved, and tolerances and accuracy of tooling within groups is not as critical and is therefore less expensive.

Moreover, since the seal bands 30 in several preferred forms of the invention provide a sinuous path in use, the seal does not depend for its effectiveness on whether the seal band lies within a single plane, and accordingly, the seals of the invention are much more tolerant in use of shaft-to-bore misalignment, a cocked position of installation, etc.

It is also well known that a number of prior art pumping seals depend importantly on the application of relatively strong compressive radial forces thereto in order to provide a combination of pumping action and good static sealing. However, seals of the present invention provide an effective static seal and good pumping action over a very wide range of radial compressive forces. As a result of this feature, much less radial preload is required when the seal is installed. This is advantageous because a seal with a light lip contact pressure has a relatively extended life expectancy.

In addition to the foregoing advantages, another advantage of seals made according to the present invention is that, since the seal band undulates axially, a relatively increased axial length of shaft is swept by contact with the seal. As a consequence, a relatively great surface area of the shaft, such as the portion thereof shown in broken lines in FIG. 4, is available for heat transfer. Since it it understood that an ordinary film of oil disposed between the interior surface of a typical seal band and the exterior surface of a typical shaft is commonly of the order of 0.0005 inch or less, it will be appreciated that the velocity gradients within this oil film at high peripheral shaft speeds causes very great shear within the oil and a significant temperature rise at the seal-shaft interface. The seal itself is not ordinarily a good conductor of heat, and accordingly, the metal shaft serves as the best heat conductor under these conditions. Thus, oil seals according to the invention also provide improved cooling, which minimizes seal wear, oil oxidation, etc.

Referring now to other features of the invention, the angle of the outwardly directed surface 24 and the shaft axis is preferably of the order of 20° to 25°, but this angle may be from about 15° up to about 30°, or even somewhat more or less, depending on conditions. Typically, the angle of the surface 28 to the seal axis is 45° to 50° but this angle may often be made 40° to 60°, or may vary somewhat to either side of these limits. Typically, the included angle between the two surfaces is from about 110° to 130°.

In the case of seals of the type shown in FIGS. 5 and 6, the angle of any surface may vary 10° or more to either side of initial position, but preferably varies somewhat less, usually including a total variation of about 10° to 15°. Referring now to the total excursion from a given point on the surface of the shaft to be sealed, the typical seal of the invention is made so as to provide about 0.020 inch of total axial excursion, i.e. an amplitude of 0.010 inch. Effective seals have been made using a seal band with an amplitude of 0.005 inch, that is, a total sweep of 0.010 inch, or even less; in larger size seals, axial amplitudes larger than 0.030 inch may prove useful.

As is well known to those skilled in the art, the seal is formed of conventional materials, the lip or body portion 18 of the seal being typically made from a synthetic elastomer, such as a nitrile rubber, a silicone rubber, an acrylate rubber, certain fluoroelastomers, or various hydrocarbon rubbers, and the mounting flange being made from steel or the like.

Referring now to FIG. 7, an alternate form of seal unit is shown wherein the body 18 has a plurality of undulating contact paths 34c formed on an associated shaft 32c by contact with the seal band portions 30c formed by the junctions between surfaces 24c, 28c, facing the air and oil sides, respectively. As clearly appears in FIG. 7, one of the dry side surfaces 24c is relatively extended, as is one of the oil side surfaces 28c, while the remaining surfaces 24c, 28c between edges 30c are of greatly reduced extent and lie between seal bands 30. Although the use and operation of this form of seal will be discussed in detail elsewhere, it will be noted that it bears a resemblance to the form of seal shown in FIGS. 1, 2 and 4, except for the plurality of bands 30c forming the plural contact paths 34c.

Referring now to FIG. 8, it is shown that a rotatable cutting tool 52c may be used to form a core body 42 in a manner similar to that described in connection with an explanation of FIG. 4. However, in this case, after surfaces 46c, 48c are ground, the tool 52c is moved to the broken line position of FIG. 8, where a second line 50 is cut by a similar undulating movement of the tool 52c. As in the example of FIG. 4, the tool 52 is defined in part by surfaces 56c, 58c which meet to define an annular line 60c. Upon completion, the core includes a series of steps or grooves defined by the pairs of oppositely directed surfaces 46c, 48c. Seals of the type shown in FIG. 7 are then formed by molding, using the core of FIG. 8.

Referring now to FIG. 9, a seal unit is shown wherein the body 18d thereof is defined by oil side surface 28d and two air side surfaces 24d, 25d, with the seal band 30d being defined by the junction of the surfaces 25d, 28d. The seal is similar to the other seals described herein in that the contact path 34d undulates in a generally sinusoidal or other desired form; however, the angle formed between the shaft axis and the seal surface 25d is substantially smaller than the angle formed between the shaft axis and the surface 24d. In this way, the angle between the shaft and the effective or working surface portion 25d of the body 18 is very small, while the angle between the nonworking portion 24d of the barrel cone surface is significantly greater.

In this manner, the seal tends to draw a minimum of oil to the left as shown in FIG. 9, because the more shallow angle tends to sweep a minimum of oil; however, the steep angle of the surface 28d is operative to return the maximum amount of oil to the right. With this arrangement of the compound barrel cone having two surfaces 24d, 25d, the angle of the working surface 28d is minimized, but the increased angle of the surface 24d permits the seal to achieve an otherwise ordinary profile.

Referring now to FIG. 10, a form of seal is shown wherein the body 18e resembles the form of seal body shown in FIGS. 1, 2, and 4, and which accordingly is characterized by surfaces 28e and 24e which meet to define a seal band 30e forming an undulating contact path 34e on an associated shaft 32e. However, the contact band 34e includes plural nodes 66 spaced apart by transition areas on surfaces 68, 70, 72, 74. In this form of the invention, every other or alternate portion 68, 72 of the path 34e is relatively short and steep compared to the remaining portions 70, 74 thereof. Thus, the wave form is one wherein the seal band on one side of a node is in the form of a gradual or gentle curve while in the other portion thereof, it comprises a steeper curve or slope. Accordingly, a seal of this type will tend to pump oil at a first rate in one direction of shaft rotation, while in the other direction of shaft rotation, the seal will pump oil in the same axial direction, but will do so at a different rate.

Referring now to FIGS. 11–16, a plurality of other forms of seal are shown, and it will be noted that different geometric forms and patterns are traced by these forms of seals onto the shaft with which they are associated. Thus, FIG. 11 shows the contact path 34f to comprise a series of scallops, cycloids, hypocycloids, or the like, with the seal band 30f undulating axially in the manner shown. Otherwise, the seal resembles that shown in FIGS. 1, 2 and 4.

In FIG. 12, the surfaces 24g, 28g define a seal band 30g, the contact path 34g of which contains one or more straight portions 76 which are offset from each other, but joined to each other by inclined transition sections 78.

In FIG. 13, the contact path 34h formed on the shaft 32h by the seal band 30h is a zig-zag or saw-tooth type pattern having a plurality of generally straight portions 80 which are inclined with respect to the travel direction of the shaft surface preferably at a moderate angle. Although forming a core to manufacture seals having this contact pattern, as a practical matter, is somewhat difficult, seals made as shown in FIG. 13 having a working surface or seal band which, while undulating in a general sense, does not undulate in a sinusoidal manner.

In the form of seal shown in FIG. 14, the contact path 34i is of a generally undulating pattern in part, with the seal band 30i containing portions which undulate with a given amplitude, and in addition thereto, a straight line portion designated 84. The undulations comprising the contact path 34i extend between a plurality of nodes 82 which are of gradually decreasing axial excursion in respect to the line 84. A seal of this type may include one or more straight sections 84 between which are disposed the undulating sections. The form shown is approximately that of a damped sine or cosine curve.

Referring now to FIG. 15, a form of seal is shown wherein the oily side surface 28j and air side surface 24j meet to define a composite form seal band 30j. Accordingly, the trace or path 34j of the seal band 30j on the shaft 32j contains one or more straight line portions 86 with the ends thereof joined to undulating or axially oscillating, wave-like portions 88. Seals made in this manner may include a wave form which proves desirable from a pumping standpoint, but the straight line contact areas 86 between pumping surfaces may serve to alter the pumping rate somewhat or change the geometry of the sealing lip as far as shaft accomodation or fit is concerned.

Referring now to FIG. 16, a construction is shown wherein the body 18a includes the air and oil side surfaces 24k, 28k which meet to define a sealing band 30k. However, since the undulations or axial excursions of the surfaces 24k, 28k are oppositely directed, the path 34k includes both portions 90 of increased axial width and portions 92 of decreased or substantially zero axial width.

Referring now in particular to FIG. 17, a still further form of seal unit is shown to include a body portion 18m which is formed from air and oil side surfaces 24m, 28m which meets to define a seal band 30m having an undulating contact path 34, on an associated shaft 32m. However, in addition to the undulation formed by the lip, it will be noted that there are plural spaced apart auxiliary pumping elements 94 which provide spaced apart points of contact 96 on the shaft 32m. As shown, at the nodes 98 of the seal band 30m, the seal band becomes tangent to or closely approaches the auxiliary elements 96 so as to define therebetween regions of convergence which are effective to pump in both directions.

Referring now to FIG. 18, a seal forming core unit 42m is shown to be similar if not identical to the core unit shown in FIG. 3, except that the unit contains grooves or notches 100 at spaced apart points along the surface 46 thereof which forms the air side surface 24m of the seal. As shown in FIG. 18, the tool 52m, which is similar to the tool described in conjunction with the description of FIGS. 3 and 8, is undulated as the core is rotated during formation to define the walls 46m, 48m of the core 42m. After the core is formed in this manner, a second cutting tool 102 is periodically moved into engagement with the surface 46m of the core 42m to cut one or more of the grooves 100 therein. Upon molding, the rubber formed in the grooves 100 forms the auxiliary pumping elements 94 shown in FIG. 17. Although the elements 194 might assume various forms, including curvilinear forms, the illustrated form is one preferred form which is operative to provide satisfactory results in use.

Referring now to certain characteristics of the forms of seal shown in FIGS. 7–17, it will be noted that a multiple seal band design such as is defined in FIG. 7 can provide a plural element or back-up type sealing action. If desired, the groove or annular notches formed in seal bands 30c may be packed with a more dense lubricating material, such as a grease or the like. Moreover the construction of FIG. 7 may be made with the angle between the right-hand surface 28c and the shaft axis the same as that between the left-hand surface 24c and the shaft axis, with the angles of the other surfaces 24c, 28c partially reversed so as to provide a seal unit wherein, for example, the left-hand contact path would serve to pump fluid to the left whereas the right-hand contact path area 34c would tend to pump liquid to the right.

Referring to FIGS. 8 and 18, it will be understood that, in performing the illustrated method, the cutting or grinding tool might also be rocked about through an angle about a point on the surface 60c thereof to produce a seal of the type shown in FIG. 5, for example.

As pointed out, the type of seal shown in FIG. 9 can be made to provide substantial pumping action because of the greatly reduced angle of the surface 25b, whereas the desired prior art form of cross section of the body 18 can largely be maintained by providing a surface 24d which is of an increased angle of departure. The angle of the surface 28d is selected so as to be capable of bringing about a strong retentive action with regard to oil on the wet side of the seal band 30d.

FIG. 10 shows one way wherein different rates may be established for pumping because different effective angles of attack are provided in different areas 68, 70, for example. Thus, a case may be considered where, as in a transmission for example, the shaft rotational speed in one direction is commonly quite high and commonly low in the opposite direction; the desired pumping characteristics may be selected on this basis. In such a case, as where a single reverse gear is provided, this gear might be considerably lower than the forward gear and therefore cause a tail shaft to rotate in an opposite direction at reduced speed. The same situation could be true of reversing drives or transfer cases associated with four-wheeled drive units. According to the present invention, a seal may be constructed which will have a relatively high pumping rate per unit of rotational speed in one direction, and which would ordinarily be used with a shaft rotating only at low speeds in such directions, while, upon rotation in the opposite direction, the seal would desirably pump at a lower rate, since faster rotational shaft speeds in such direction would ordinarily be anticipated.

A construction of the type shown in FIG. 11 serves to present somewhat different angles of attack to the fluid held on an associated shaft 32f. Seals of the type shown in FIG. 12 may be somewhat easier to manufacture, since only one or more offset legs 76 need be provided, and the spacing therebetween may be irregular, with the result that the meeting or matching portions of the mold cut by the tool are more easily made. FIG. 13 shows another form of seal which is functionally quite similar to the type shown in FIGS. 1, 2 and 4 as well as FIG. 7, except that the leg portions are straight rather than curvilinear except at or near the points of inflection thereof. It is apparent from a consideration of FIG. 13 that two different pumping rates might be incorporated by changing the angles of the legs 80 with respect to each other, thus achieving an effect similar to that achieved by the seal of the form shown in FIG. 10. FIGS. 14 and 15 are other variations, one showing a damped curve type arrangement wherein the maximum excursion of the oil on the shaft might be fairly substantial but the entire width of the axial extent of the shaft would not necessarily be contacted by major portions of the seal during every revolution.

The form of FIG. 16 is a combination of the novel features of the invention with certain prior art suggestions. This form of seal no doubt would tend to produce a pumping action which is somewhat localized at the reduced axial width portions of the unit, since the oil would pass most easily beneath the sealing lip at the area 92 of minimum seal band width.

FIGS. 17 and 18 also show a seal and method for making the same which includes all the novel features of the present invention but which provides a seal which may be combined with an ordinary static lip for use in pumping certain fluids, if this proved desirable.

From the foregoing, it will be apparent that the forms of seals shown merely illustrate by way of example the great variety of seal constructions which might be made in keeping with the principles of the present invention.

It will thus be seen that the present invention provides a number of forms of novel and useful oil seals having birotational pumping action, and having a number of other advantages and characteristics, including those pointed out herein and others which are inherent in the invention. Several forms of the oil seal of the invention having been described in detail by way of example only, it will be apparent to those skilled in the art that a number of modifications and changes thereto may be made without departing from the spirit of the invention or the scope of the appended claims.

I claim:

1. A method of forming a molding core for use in forming a seal unit, said method including providing a core blank, and cutting a pair of generally oppositely directed, radially undulating surfaces therein by moving radially inwardly of the axis of said core blank to a predetermined depth a cutting tool having a pair of oppositely directed, generally frusto-conical cutting surfaces thereon which meet to define a peripheral annular cutting edge, while rotating said tool about its own axis and moving the center of said tool about the axis of said blank at said predetermined depth while also rocking said cutting tool through an arc having the center thereof lying on said cutting edge at the point of contact between said edge and the portion of said blank engaged thereby.

2. A method as defined in claim 1 which further includes cutting grooves in one of said undulating surfaces at selected but spaced apart points therealong.

3. A method of forming a molding core for use in molding a seal unit having a sinuously extending annular seal band, said method including providing a core blank, and cutting therein a pair of generally oppositely directed, radially undulating surfaces therein by moving radially inwardly of the axis of said core blank to a predetermined depth a cutting tool having a pair of oppositely directed, generally frusto-conical cutting surfaces thereon which meet to define a peripheral annular cutting edge, said method also including rotating said tool about its own axis, moving the center of said tool about the axis of said blank at said predetermined depth and reciprocating said cutting tool axially through a predetermined path as said tool is moved about said center of said blank whereby a pair of axially undulating surfaces which meet along an annular line are formed in said blank.

4. A method as defined in claim 3 in which said cutting tool is also rocked through an arc having the center thereof lying on said cutting edge at the point of contact between said edge and the portion of said blank engaged thereby.

5. A method as defined in claim 3 which further includes cutting grooves in one of said undulating surfaces at selected but spaced apart points therealong.

* * * * *

UNITED STATES PATENT OFFICE
CERTIFICATE OF CORRECTION

PATENT NO. : 3,927,600
DATED : December 23, 1975
INVENTOR(S) : Glenn W. Peisker

It is certified that error appears in the above-identified patent and that said Letters Patent are hereby corrected as shown below:

In column 5, line 40, the word appearing as "interior" should be --exterior--

Signed and Sealed this twenty-seventh Day of April 1976

[SEAL]

Attest:

RUTH C. MASON
*Attesting Officer*

C. MARSHALL DANN
*Commissioner of Patents and Trademarks*